(12) United States Patent
Kim et al.

(10) Patent No.: US 11,675,489 B2
(45) Date of Patent: Jun. 13, 2023

(54) ELECTRONIC DEVICE INCLUDING FLEXIBLE DISPLAY

(71) Applicant: Samsung Electronics Co., Ltd., Suwon-si (KR)

(72) Inventors: Byeongcheol Kim, Suwon-si (KR); Jooho Seo, Suwon-si (KR); Sungho Lee, Suwon-si (KR); Junwon Lee, Suwon-si (KR); Donghee Kang, Suwon-si (KR); Jongchul Choi, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/231,385

(22) Filed: Apr. 15, 2021

(65) Prior Publication Data

US 2021/0405857 A1 Dec. 30, 2021

(30) Foreign Application Priority Data

Jun. 25, 2020 (KR) .................. 10-2020-0078017

(51) Int. Cl.
*G06F 3/04845* (2022.01)
*G06F 3/0481* (2022.01)
*G06F 1/16* (2006.01)
*G06F 3/04886* (2022.01)

(52) U.S. Cl.
CPC ........ *G06F 3/04845* (2013.01); *G06F 3/0481* (2013.01); *G06F 1/1652* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 8,836,713 B2 * | 9/2014 | Caskey | ................. | G06F 3/1446 345/560 |
| 9,152,180 B2 * | 10/2015 | Kim | ..................... | G06F 1/1652 |
| 10,606,362 B2 | 3/2020 | Chung | | |
| 2008/0318633 A1 * | 12/2008 | Wong | .................. | H04M 1/0216 455/566 |

(Continued)

FOREIGN PATENT DOCUMENTS

| | | | |
|---|---|---|---|
| CN | 110244893 A | | 9/2019 |
| CN | 112995364 A | * | 6/2021 |

(Continued)

OTHER PUBLICATIONS

International Search Report dated Jul. 19, 2021, issued in International Application No. PCT/KR2021/004488.

*Primary Examiner* — Mandrita Brahmachari
(74) *Attorney, Agent, or Firm* — Jefferson IP Law, LLP

(57) ABSTRACT

An electronic device is provided. The electronic device includes a display and a processor, wherein the processor is configured to display a multi-window in the display region of the display, identify the position of a user input, receive an input related to the size change of the display region of the display, and change the size of the display region of the display and display a window corresponding to the identified position of the user input in the display region of the display.

18 Claims, 30 Drawing Sheets

(56) References Cited

U.S. PATENT DOCUMENTS

| | | | |
|---|---|---|---|
| 2009/0105994 A1* | 4/2009 | Mandolini | G06Q 50/16 703/1 |
| 2009/0144653 A1* | 6/2009 | Ubillos | G06F 3/04845 715/800 |
| 2011/0209100 A1* | 8/2011 | Hinckley | G06F 1/1698 715/863 |
| 2012/0218302 A1* | 8/2012 | Sirpal | G06F 3/1446 345/649 |
| 2012/0231848 A1* | 9/2012 | Pegg | G06F 1/1624 455/566 |
| 2014/0184526 A1* | 7/2014 | Cho | G06F 3/041 345/173 |
| 2014/0208262 A1* | 7/2014 | Huang | G06F 3/0481 715/800 |
| 2014/0237421 A1* | 8/2014 | Kuhne | G06F 40/103 715/800 |
| 2015/0186024 A1 | 7/2015 | Hong et al. | |
| 2016/0349971 A1 | 12/2016 | Chi et al. | |
| 2018/0018930 A1* | 1/2018 | Pasupathi | G06F 1/163 |
| 2018/0136835 A1 | 5/2018 | Heo et al. | |
| 2019/0012008 A1 | 1/2019 | Yoon et al. | |
| 2019/0187758 A1 | 6/2019 | Lee et al. | |
| 2020/0278720 A1 | 9/2020 | Kim et al. | |

FOREIGN PATENT DOCUMENTS

| | | |
|---|---|---|
| KR | 10-2015-0053650 A | 5/2015 |
| KR | 10-2015-0080756 A | 7/2015 |
| KR | 10-2016-0139287 A | 12/2016 |
| KR | 10-2016-0139320 A | 12/2016 |
| KR | 10-2017-0116883 A | 10/2017 |
| KR | 10-2019-0031870 A | 3/2019 |
| WO | 2017/099276 A1 | 6/2017 |

* cited by examiner

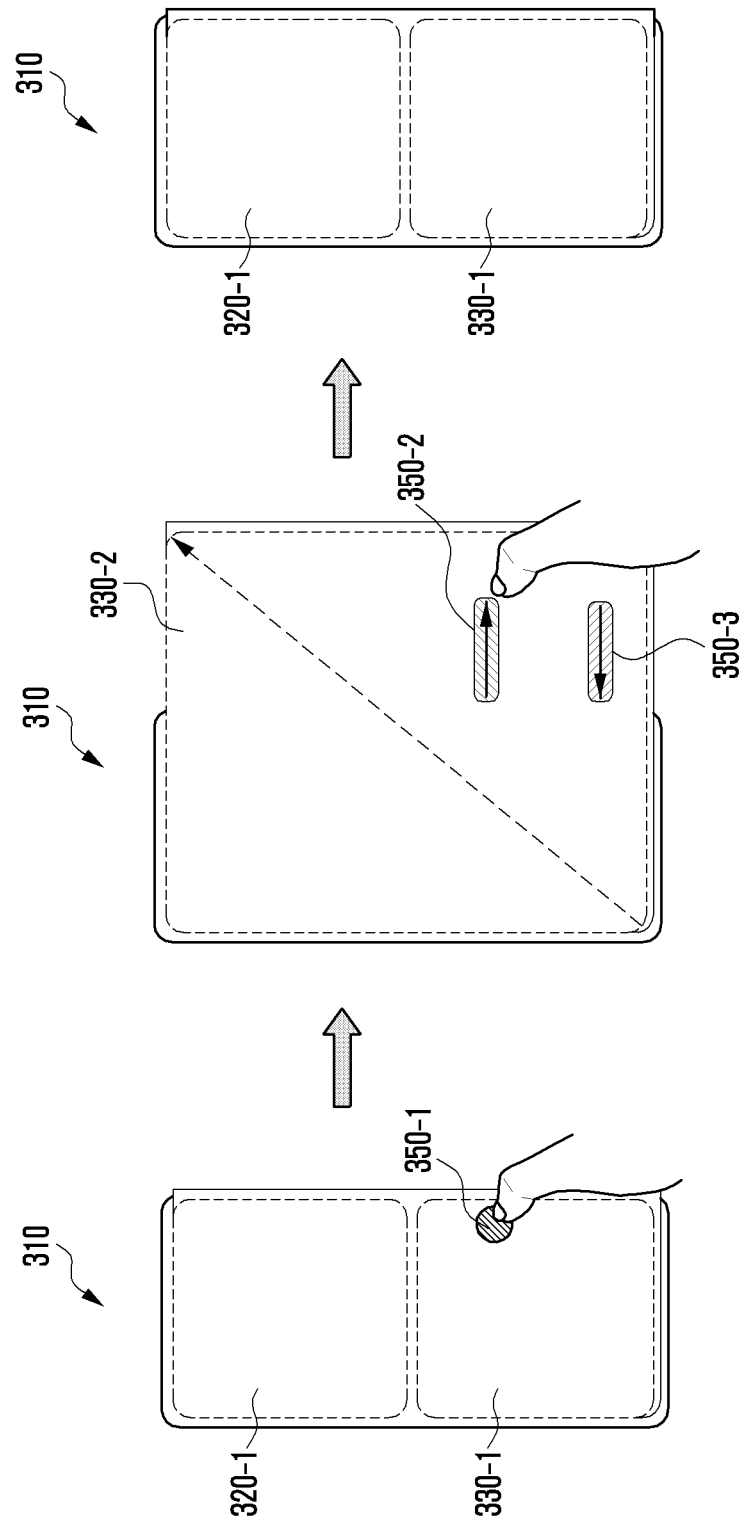

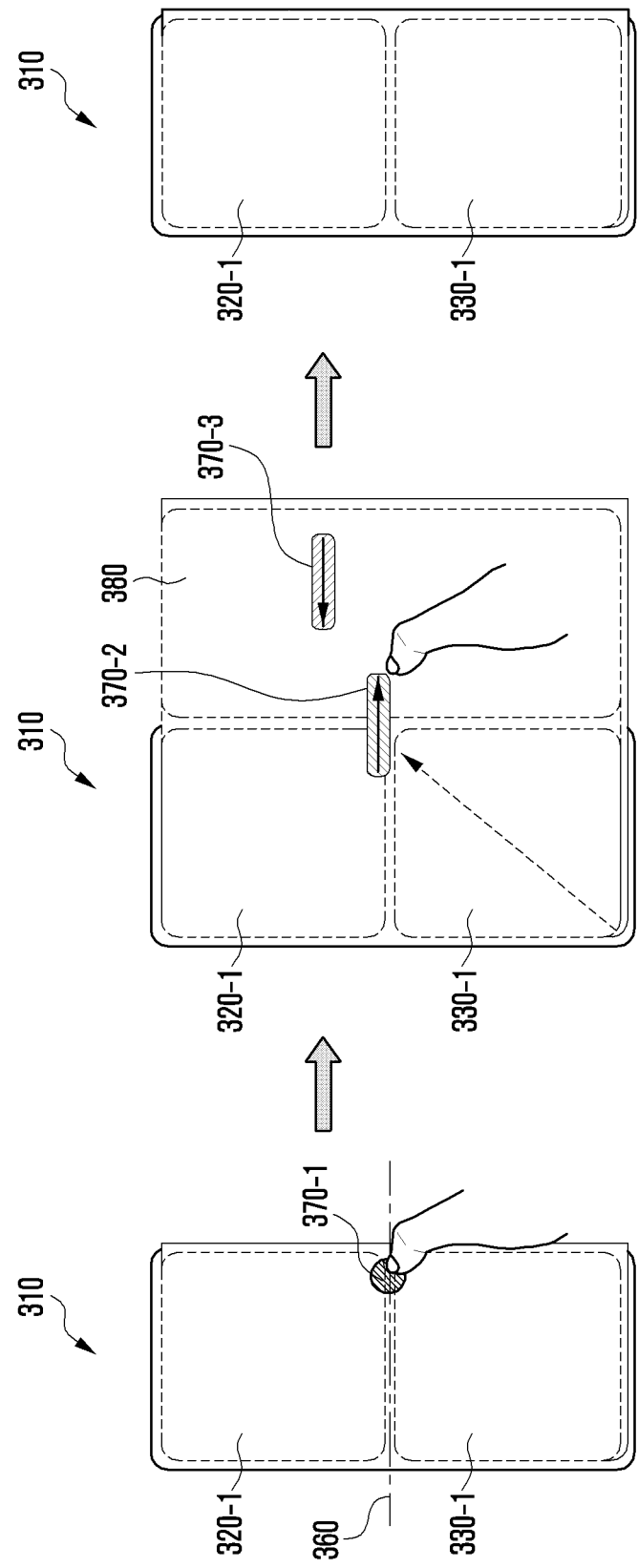

ELECTRONIC DEVICE INCLUDING FLEXIBLE DISPLAY

CROSS-REFERENCE TO RELATED APPLICATION(S)

This application is based on and claims priority under 35 U.S.C. § 119(a) of a Korean patent application number 10-2020-0078017, filed on Jun. 25, 2020, in the Korean Intellectual Property Office, the disclosure of which is incorporated by reference herein in its entirety.

BACKGROUND

1. Field

The disclosure relates to an electronic device including a flexible display having a display region that can be extended or reduced.

2. Description of Related Art

Functional differences between electronic devices from respective manufacturers have substantially decreased, and electronic devices are accordingly becoming slimmer in order to satisfy consumers demands. There is ongoing development to increase the rigidity of electronic devices, to enhance design aspects thereof, and to differentiate functional elements thereof. Accordingly, electronic devices are gradually evolving from quadrangular shapes to various shapes according to the related art. For example, electronic devices having various deformable structures have been developed such that they can be carried conveniently and, when used, large-screen displays can be utilized.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic devices for a rollable-type electronic device (hereinafter, referred to as a rollable electronic device) which can be deformed, when used, such that the display region of the display thereof can be extended or reduced. The rollable electronic device may include a first housing and a second housing (or a sliding plate), which may be coupled to each other to be able to move in an at least partially fitted-together type. For example, the second housing (or sliding plate) may be coupled so as to support a flexible display (or an extendable display) and to operate in an at least partially sliding type from the first housing. The second housing may be manually opened/closed by the user or may be automatically switched to an open/closed state by an internal driving mechanism, thereby inducing variation of the display area. According to an embodiment, a multi-window display method may solely be considered if the display size (resolution) is fixed, or if the display size is limited to two types (folded state and unfolded state) as in the case of a foldable electronic device. However, in the case of a device (for example, a slidable/rollable electronic device) having a display extendable to various sizes, a multi-window operation may be impeded by respective windows which are to be arranged according to the size, or by various icons, the sizes of which are to be changed accordingly. As a result, it may be difficult to execute a multi-window function in response to the user's intention, and erroneous operations may occur.

Additional aspects will be set forth in part in the description which follows and, in part, will be apparent from the description, or may be learned by practice of the presented embodiments.

In accordance with an aspect of the disclosure, an electronic device is provided. The electronic device includes a display, and a processor, wherein the processor is configured to display a multi-window in a display region of the display, identify a position of a user input, receive an input related to a size change of the display region of the display, and change a size of the display region of the display and display a window corresponding to the identified position of the user input in the display region of the display.

In accordance with another aspect of the disclosure, an operation method of an electronic device is provided. The operation method includes identifying a position of a user input, receiving an input related to a size change of a display region of a display, and changing a size of the display region of the display and displaying a window corresponding to the identified position of the user input in the display region of the display.

An electronic device including a display having a display region that can be extended or reduced according to various embodiments is advantageous in that, when a multi-window operation is performed in the display region of the display, the arrangement of respective each multi-window is changed (or the size thereof is changed or icons are displayed) according to the display region of the display such that the multi-window can be manipulated in response to the user's intention.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3A, 3B and 3C illustrate an example of extension of a display region of a display of an electronic device according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
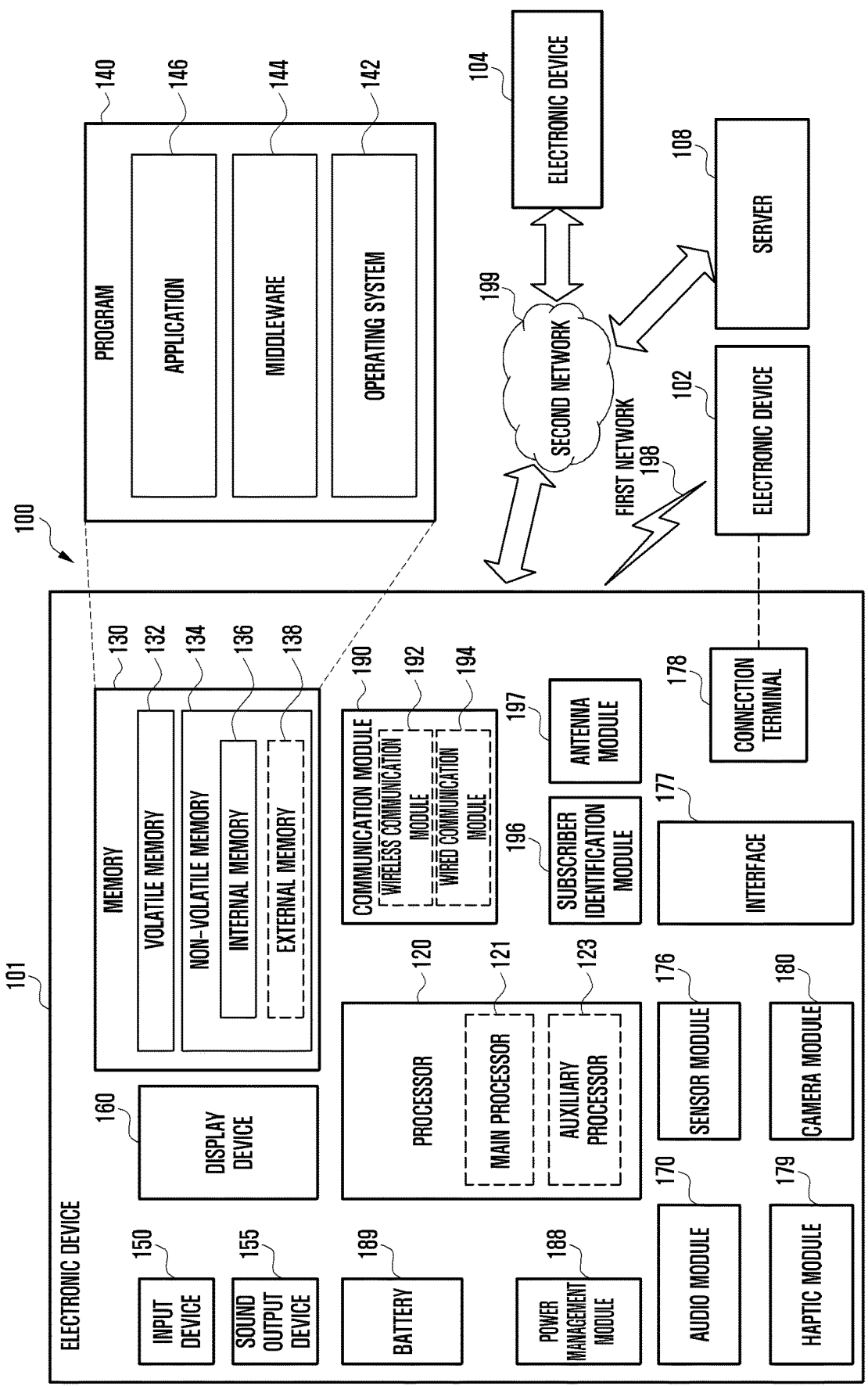
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2A:
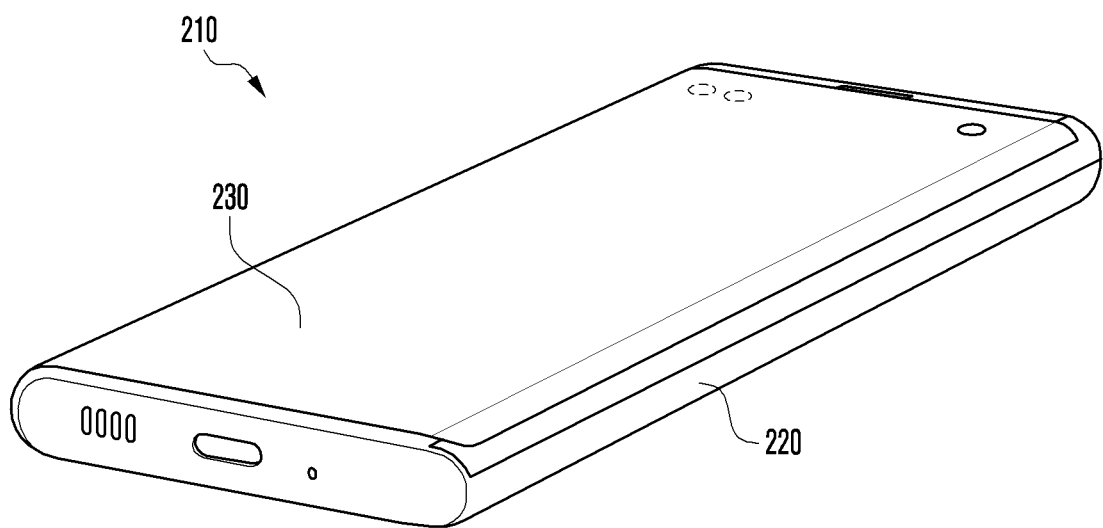
FIG. 2A is a perspective view of an electronic device according to an embodiment of the disclosure.

FIG. 2A is a perspective view of an electronic device according to an embodiment of the disclosure.

Figure 2B:
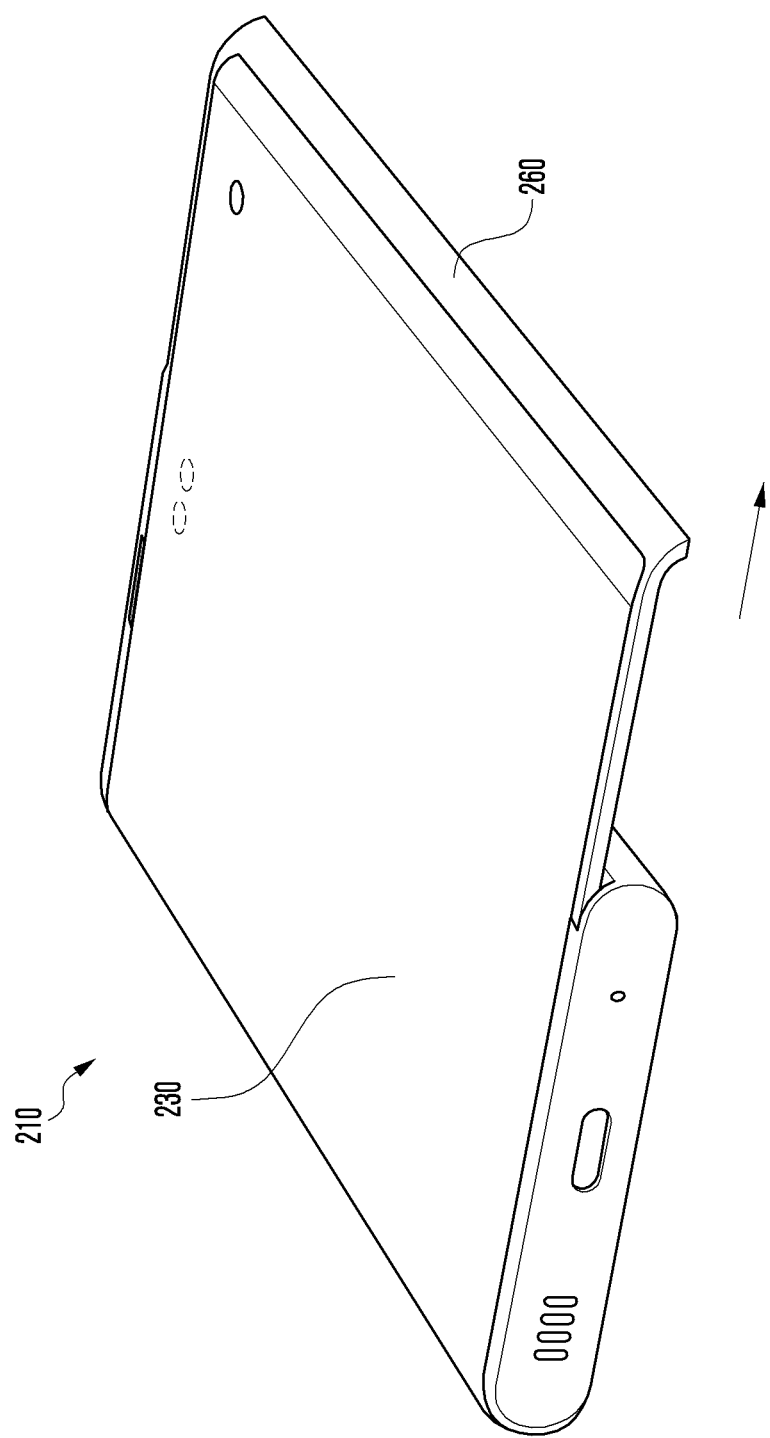
FIG. 2B is a perspective view of an electronic device according to an embodiment of the disclosure.

FIG. 2B is a perspective view of an electronic device according to an embodiment of the disclosure.

Figure 2C:
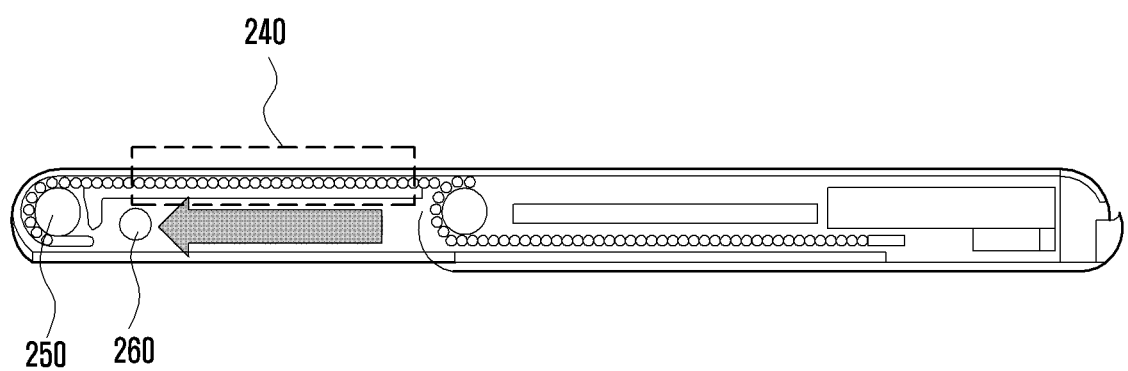
FIG. 2C is a side view of an electronic device according to an embodiment of the disclosure.

FIG. 2C is a side view of an electronic device according to an embodiment of the disclosure.

Referring to FIGS. 2A to 2C, an electronic device 210 may be at least partially similar to the electronic device 101 in FIG. 1, or may further include other embodiments of an electronic device. A display 230 included in the electronic device 210 according to various embodiments may be a flexible display. A housing of the electronic device 210 according to various embodiments may be extended or reduced. When the housing of the electronic device 210 is extended or reduced, the display region of the display may also be extended or reduced. The entire region of the display 230 may not always be a display region, and the size of the display region of the display 230 may be changed. For example, when the housing of the electronic device 210 is extended, a partial region of the display 230, which has not been exposed to the outside, may be exposed, and thus the display region of the display 230 may also be extended. On the other hand, when the housing of the electronic device 210 is reduced, a partial region of the display 230, which has been exposed to the outside, may be hidden, and thus the display region of the display 230 may also be reduced.

Referring to FIG. 2A, FIG. 2A depicts a perspective view in which the housing of the electronic device 210 is reduced, and FIG. 2B is a perspective view in which the housing of the electronic device 210 is extended (or expanded). As illustrated in FIG. 2A, when a housing 220 of the electronic device 210 is reduced, the display region of the display 230 may also be reduced. For convenience, a user may carry the electronic device 210 in the state in which the housing 220 of the electronic device 210 is reduced. Referring to FIG. 2B, when the housing 220 of the electronic device 210 is extended, the display region of the display 230 may also be extended. For example, when a user watches multimedia or plays a game or when a user uses multiple services at the same time, the user may extend the housing 220 of the electronic device to use the extended display region of the display 230.

Referring to FIG. 2C, FIG. 2C depicts a side view of the electronic device 210. The housing 220 of the electronic device 210 may be coupled to at least a portion of the display 230 so as to extend or reduce the display region of the display 230. For example, the electronic device 210 may include a multi-bar hinge 240 and/or a rolling bar 250 in order to extend or reduce of the display region of the display 230. The electronic device 210 may further include a motor 260 configured to control the rolling bar 250.

According to various embodiments, the electronic device 210 may receive an input related to the size change of the display region of the display 230 to extend or reduce of the display region of the display 230. For example, when a portion of the display 230 is bent or rolled inward by the rolling bar 250, the size of the display 230 exposed to the outside is reduced, and thus the display region of the display 230 may be reduced. On the other hand, when the portion of the display 230 rolled by the rolling bar 250 is unrolled, the size of the display 230 exposed to the outside is extended, and thus the display region of the display 230 may also be extended. The display region of the display 230 may be updated after the display 230 has been completely extended or reduced. The display region of the display 230 may be updated in real time/at regular time intervals while the display 230 is extended or reduced. The display region of the display 230 may be updated in units of a certain size of a region extended or reduced while the display 230 is extended or reduced.

According to various embodiments, the display region of the display 230 may be extended or reduced in a manual, automatic, or semiautomatic manner on the basis of the input related to the size change of the housing 220. For example, when a user manually extends or reduces the housing 220 by using force, the display region of the display 230 may be extended or reduced. Alternatively, when the user extends or reduces the housing 220 of the electronic device 210 by pressing a hardware button (e.g., a side key) or a software button (e.g., a soft key), the display region of the display 230 may be automatically extended or reduced. The housing 220 of the electronic device 210 may be extended or reduced by the motor 260. Furthermore, when the user pushes or pulls the housing 220 of the electronic device 210 by using a force having a predetermined strength or more, the electronic device 210 may operate the motor 260 to extend or reduce the housing 220 of the electronic device 210 in an automatic or semiautomatic manner in response thereto. When the housing 220 of the electronic device 210 is extended or reduced, the display region of the display 230 may also be extended or reduced.

According to various embodiments, the electronic device 210 may include a multi-bar hinge formed on the rear surface of the display in order to adjust the size of the housing 220. The multi-bar hinge may roll the display 230, and may support the display 230 to keep the display 230 flat.

According to various embodiments, the electronic device 210 may detect, using a magnet or a hall sensor disposed in the rear surface of the display 230, the rotation amount of the motor 260 to sense a speed (or a size) at which the housing 220 is extended or reduced. The electronic device 210 may cascade, based on the sensed speed (or size), windows displayed in the display region of the display 230 or provide a gradation effect.

Hereinbefore, an example in which the display region of the display 230 is extended or reduced has been described using the electronic device 210, the housing 220 of which is extended or reduced at one side thereof. However, the various embodiments may be applied to even the case in which the display region of the display 230 is extended or reduced by other methods for extending or reducing both sides of the housing 220 of the electronic device.

When the display region of the display 230 can be extended or reduced according to various embodiments, if necessary, the user may extend or reduce the display region of the display 230 to maximize the usage efficiency of the electronic device 210. The electronic device 210 may supply power based on the size of the display region of the display 230, and may thus reduce power consumption.

Figure 3A:
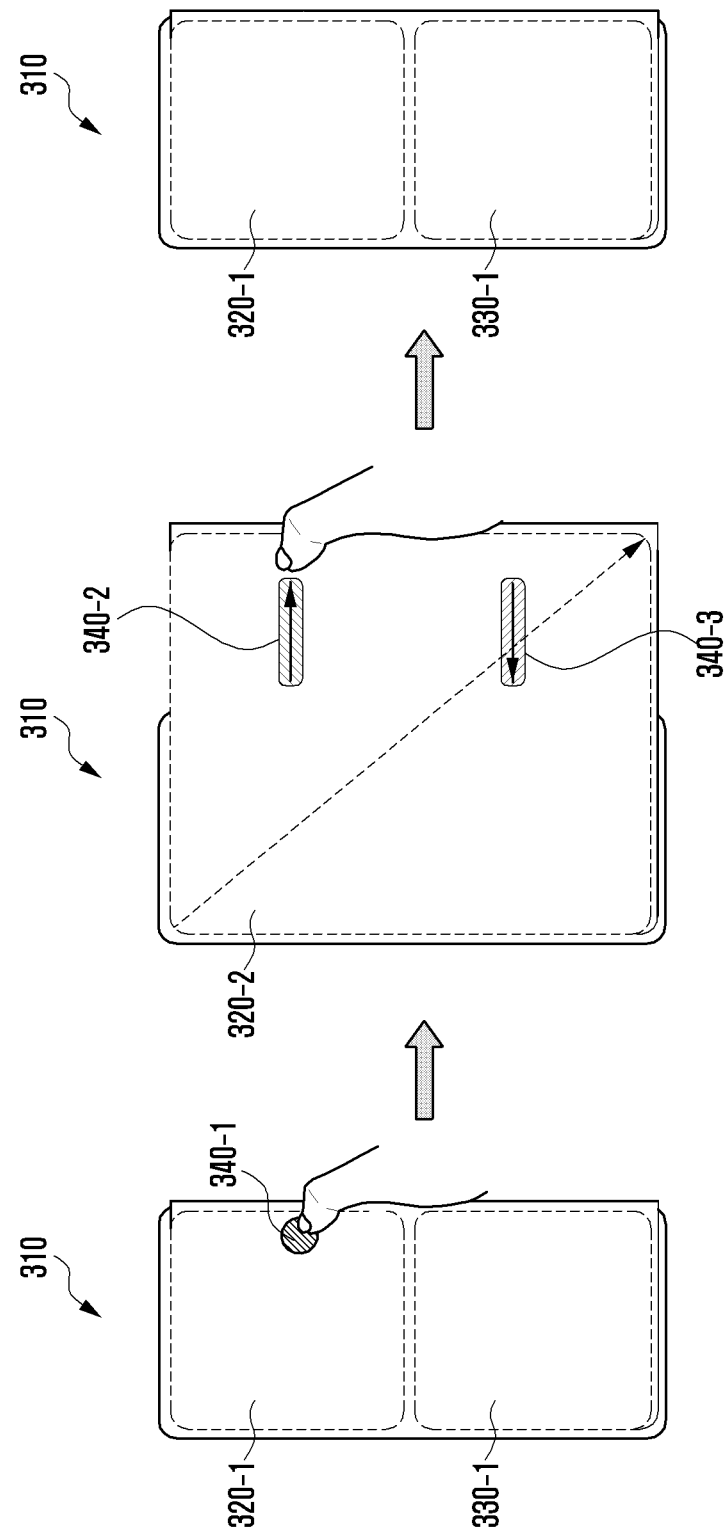

FIG. 3A illustrates an example of extension of a display region of a display of an electronic device according to an embodiment of the disclosure.

FIG. 3B illustrates an example of extension of a display region of a display of an electronic device according to an embodiment of the disclosure.

FIG. 3C illustrates an example of extension of a display region of a display of an electronic device according to an embodiment of the disclosure.

According to various embodiments, an electronic device 310 (e.g., the electronic device 210 in FIG. 2A) may include a display, and a first window 320-1 and a second window 330-1 may be displayed in the display region of the display. For example, a moving image may be reproduced in the first window 320-1, and a text message may be displayed in the second window 330-1. Alternatively, in each of the first window 320-1 and the second window 330-1, a different webpage according to the execution of one application may be displayed. Referring to FIGS. 3A to 3C, the first window 320-1 and the second window 330-1 are displayed in the same size. However, the first window 320-1 and the second window 330-1 may be displayed in different sizes.

According to various embodiments, the electronic device 310 may display a multi-window in the display region of the display. The electronic device 310 may identify the position of a user input (e.g., the position of a user's finger) in the display region of the display in which the multi-window is displayed. A user input may be positioned in a partial region 340-1 of the first window 320-1 as illustrated in FIG. 3A, and may be positioned in a partial region 350-1 of the second window 330-1 as illustrated in FIG. 3B. Alternatively, the user input may be positioned in a partial region 370-1 of a window boundary region 360 as illustrated in FIG. 3C. The window boundary region 360 may be a region other than a window inner region.

According to various embodiments, the user input may be an input using one finger (e.g., a thumb) while a user grips the electronic device 310, that is, when a user holds the electronic device 310. Alternatively, the user input may be a touch input (e.g. sliding or swiping) using a finger or a pen that a user moves by a force having a predetermined strength or more in a direction in which the user desires to extend or reduce the display region of a display. The display region of the display of the electronic device 310 may be extended or reduced in a manual, automatic, or semiautomatic manner depending on the user input.

According to various embodiments, the electronic device 310 may display a window corresponding to the position of the user input in the display region of the display.

Referring to FIG. 3A, when a user input 340-2 is identified in the partial region 340-1 of the first window, an extended first window 320-2 may be displayed in the entire display region of the display. The extended first window 320-2 may be extended with reference to the left upper end. When a user input 340-3 for reducing the display region of the display is received in the extended first window 320-2, the electronic device 310 may display the reduced first and second windows 320-1 and 330-1 in a re-reduced display region of the display. Alternatively, the electronic device 310 may display only the reduced first windows 320-1 in the re-reduced display region of the display. Alternatively, in the electronic device 310, an application corresponding to a window, which is not displayed in the display region of the display, may be terminated without any additional user input (not shown). For example, when the extended first window 320-2 is displayed the display region of the display, the second window 330-1 may be closed. That is, an application displayed in the second window 330-1 may be terminated.

Referring to FIG. 3B, when a user input 350-2 is identified in the partial region 350-1 of the second window, an extended second window 330-2 may be displayed in the entire display region of the display. The extended second window 330-2 may be extended with reference to the left lower end. When a user input 350-3 for reducing the display region of the display is received in the extended second window 330-2, the electronic device 310 may display the reduced first and second windows 320-1 and 330-1 in a re-reduced display region of the display. Alternatively, the electronic device 310 may display only the reduced second windows 330-1 in the re-reduced display region of the display (not shown). Alternatively, in the electronic device 310, a window, which is not displayed in the display region of the display, may be closed. The display region of the display may be updated after the display is completely extended or reduced. The display region of the display may be updated in real time/at regular time intervals while the display is extended or reduced. The display region of the display may be updated in units of a certain size of a region extended or reduced while the display 230 is extended or reduced.

Referring to FIG. 3C, when a user input 370-2 is identified in a partial region 370-1 of the window boundary region 360, a third window 380 may be displayed in at least a portion of the display region of the display. The third window 380 may be a predetermined window. For example, the third window 380 may be a home screen. Alternatively, the third window 380 may be a screen on which a specific application is executed. For example, a user may set a messenger application as a specific application in order to respond to the case in which favorite applications are not displayed in the first window 320-1 or the second window 330-1. When it is determined that the user input 370-2 is positioned in the partial region 370-1 of the window boundary region, the third window 380, in which a messenger application has been executed, may be displayed in the extended display region of the display rather than in the first window 320-1 and the second window 330-1. When a user input 370-3 for reducing the display region of the display is received in the displayed third window 380, the electronic device 310 may display the first window 320-1 and the second window 330-1 in a re-reduced display region of the display. Alternatively, the electronic device 310 may display only the third window in the re-reduced display region of the display. Alternatively, in the electronic device 310, a window, which is not displayed in the display region of the display, may also be closed.

Figure 4A:
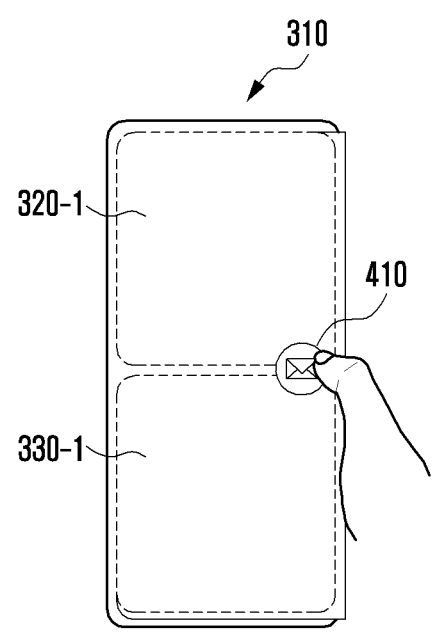
FIGS. 4A and 4B illustrate an example of displaying a multi-window in an extended display region of a display in an electronic device according to various embodiments of the disclosure.
Figure 4B:
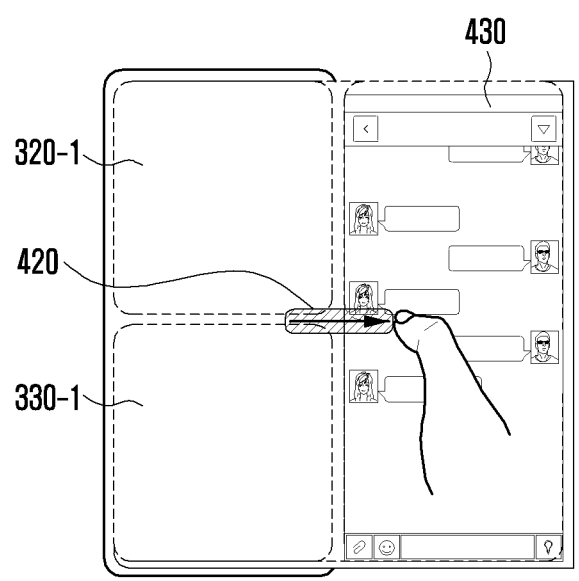

FIGS. 4A and 4B illustrate an example of displaying a multi-window in an extended display region of a display in an electronic device according to various embodiments of the disclosure.

According to various embodiments, a multi-window may be displayed in the electronic device 310 (e.g., the electronic device 210 in FIG. 2A). Referring to FIGS. 4A and 4B, the first window 320-1 and the second window 330-1 may be displayed in the electronic device 310. In the state in which the multi-window is displayed, the electronic device 310 may receive a notification message 410, and the notification message 410 may be displayed at the edge region of the electronic device 310. When an input 420 for extending the display region of a display is received at a position at which the notification message 410 is displayed, the display region of the display may be extended, and an application related to the notification message may be executed and displayed in the extended display region 430 of the display. For example, a user may hold the electronic device 310 in one hand In this state, the notification message 410 may be received, and displayed in the edge region of the electronic device 310. The user may use a finger to touch the notification message displayed in the edge region and move the notification message in a direction in which the display region of the display is to be extended. When the user input is received, the electronic device 310 may extend the display region of the display, and may display a screen for the execution of an application related to the notification message in the extended display region 430 of the display. The user may check the received notification message immediately without performing any additional operation, and may transmit a response message. Furthermore, the user may reduce the extended display region of the display to terminate the executed application.

According to various embodiments, the display region 430 of the display may be updated after the display is completely extended. The display region 430 of the display may be updated in real time/at regular time intervals while the display is extended. The display region 430 of the display may be updated in units of a certain size of a region extended while the display is extended.

FIGS. 5A to 5D illustrate an example of manipulating three multi-windows in an electronic device according to various embodiments of the disclosure.

Figure 5A:
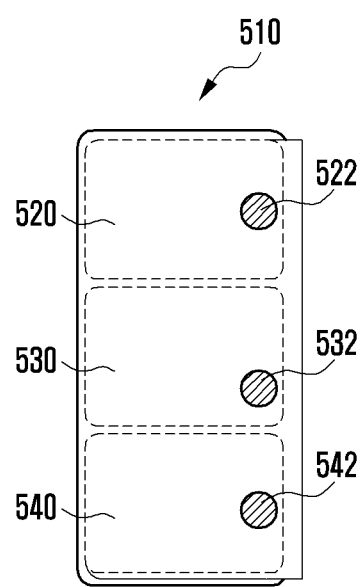
FIGS. 5A, 5B, 5C and 5D illustrate an example of manipulating three multi-windows in an electronic device according to various embodiments of the disclosure.
Figure 5B:
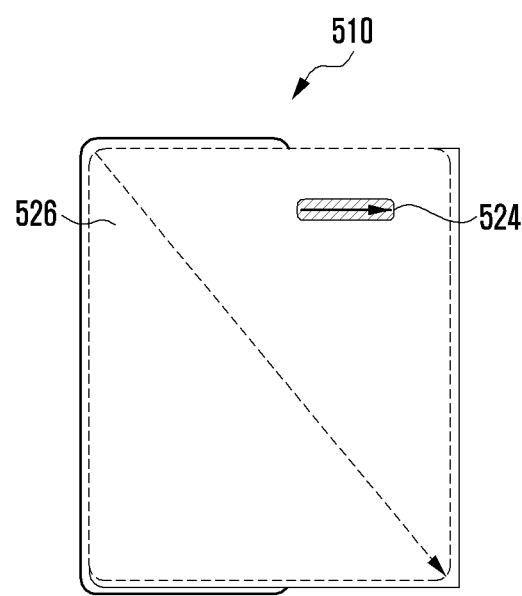
Figure 5C:
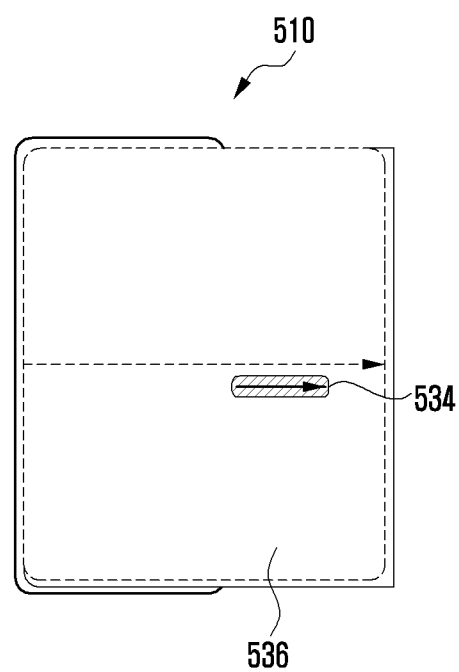
Figure 5D:
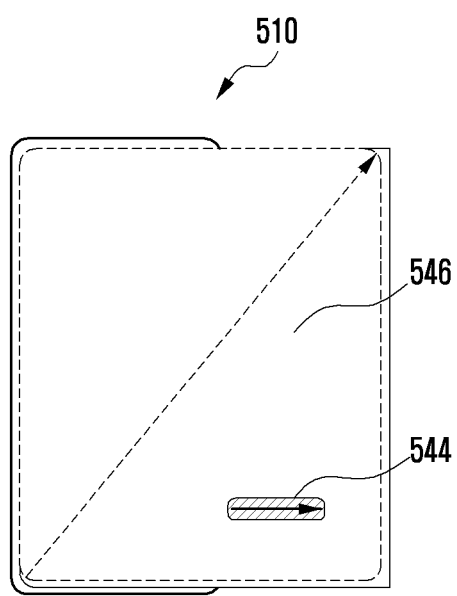

Referring to FIG. 5A, an electronic device 510 (e.g., the electronic device 210 in FIGS. 2A and 2B) may simultaneously display three windows 520, 530, and 540 in the display region of a display. The three windows 520, 530, and 540 may display execution screens of different applications. Some of the three windows 520, 530, and 540 may also display different execution screens of the same application. For example, two of the three windows may display different pages found in an execution screen of one search application.

According to various embodiments, a user may extend the display region of a display to easily extend one desired window among multiple windows which have been simultaneously displayed. The user may extend the display region of the display so as to select a desired window of the multiple windows and further display a hidden region of the window. For example, the user may select a first window 520 as a desired window. The user may touch a partial region 522 of the first window 520 to extend the display region of a display. The display region of a display of the electronic device 510 may be extended by a user input 524, and, referring to FIG. 5B, a first window 526 may be displayed in the entire extended display region of the display. The first window 526 may be extended with reference to the left upper end.

According to various embodiments, the user may select a second window 530 as a desired window. The user may touch a partial region 532 of the second window 530 to extend the display region of the display. The display region of the display of the electronic device 510 may be extended by a user input 534, and, referring to FIG. 5C, a second window 536 may be displayed in the entire extended display region of the display. The second window 536 may be extended with reference to the left center.

According to various embodiments, the user may also select a third window 540 as a desired window. The user may touch a partial region 542 of the third window 540 to extend the display region of the display. The display region of the display of the electronic device 510 may be extended by a user input 544, and, referring to FIG. 5D, a third window 546 may be displayed in the entire extended display region of the display.

According to various embodiments, when the user extends the display region of the display by touching a window boundary region of a window, a window, in which a preset application has been executed, may be displayed in the extended display region of the display.

According to various embodiments, by extending the display region of the display as necessary, the user may view information displayed in a hidden region at once, and thus may easily acquire more types of information. Alternatively, by extending the display region of the display, the user may enlarge information viewed in the size of a previous window (increase the size of pictures or characters) to display the information larger. Further, the user may conveniently favorite applications by configuring the applications to be displayed when the display region of the display is extended, thereby conveniently using the applications.

Referring to FIGS. 5A to 5D, a touch input has been described as an example of a user input. However, the various embodiments may also be applied to other inputs (e.g., a pressure touch input, a gesture input, etc.) through which one of multi-windows can be selected.

Figure 6A:
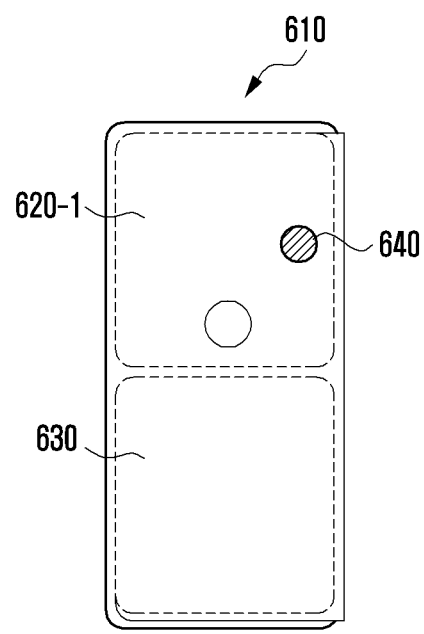
FIGS. 6A, 6B and 6C illustrate an example of manipulating a window while a display region of a display is extended according to various embodiments of the disclosure.
Figure 6B:
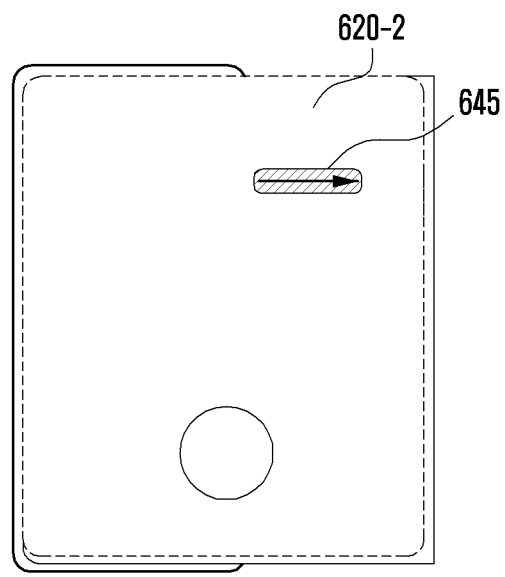
Figure 6C:
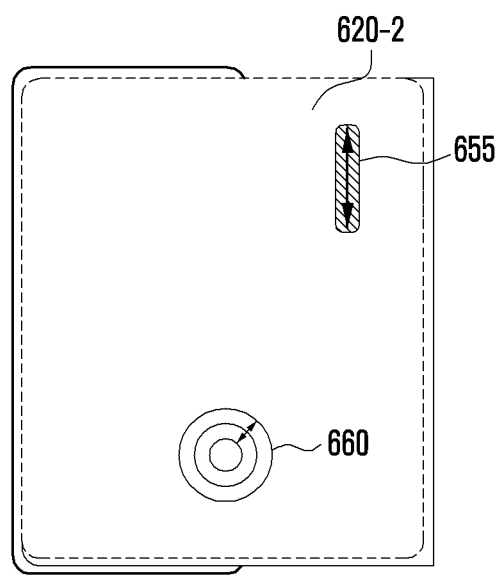

FIGS. 6A to 6C illustrate an example of manipulating a window while a display region of a display is extended according to various embodiments of the disclosure.

Referring to FIG. 6A, an electronic device 610 (e.g., the electronic device 210 in FIG. 2A) may display two windows 620-1 and 630. According to FIG. 6A, a first window 620-1 may be displayed with aspect ratio of 4:3 for example. A user may touch a partial region 640 of the first window 620-1 to extend the display region of a display.

Referring to FIG. 6B, FIG. 6B shows a first window 620-2 extended by a user input 645. The first window 620-2 shown in FIG. 6B may be extended while maintaining an aspect ratio of 4:3 like the first window 620-1 shown in FIG. 6A. Alternatively, in the case of the first window 620-2, a hidden region of the first window 620-1 in FIG. 6A may be further displayed. For example, a region, viewed by the movement of a scrollbar because the size of a window is small, may also be totally viewed in the extended display region of the display without the scrollbar.

Referring to FIG. 6C, FIG. 6C shows an example in which the extended first window 620-2 is zoomed in/out according to various embodiments. A user may easily zoom in/out a window displayed in the extended display region of the display. For example, the user may touch a partial region of the extended first window 620-2 and swipe (655) up or down. When the user touches a partial region of the extended first window 620-2 and swipes (655) up, the extended first window 620-2 may be zoomed in (that is, may be extended). When the user touches a partial region of the extended first window 620-2 and swipes (655) down, the extended first window 620-2 may be zoomed out (that is, may be reduced). In another example, the first window 620-2 may include a user interface 660 (e.g., a figure such as a circle) capable of aiding in zooming in/out. When swiping is performed from the center of the user interface 660 toward the outside thereof, the first window 620-2 may be extended, and when swiping is performed from the outside of the user interface 660 toward the center thereof, the first window 620-2 may be reduced.

Referring to FIGS. 6A to 6C, a swipe input has been described as an example of a user input for extending or reducing a window. However, a hardware key of the electronic device 610 may be used, or another input or gesture of the user may be used.

Figure 7A:
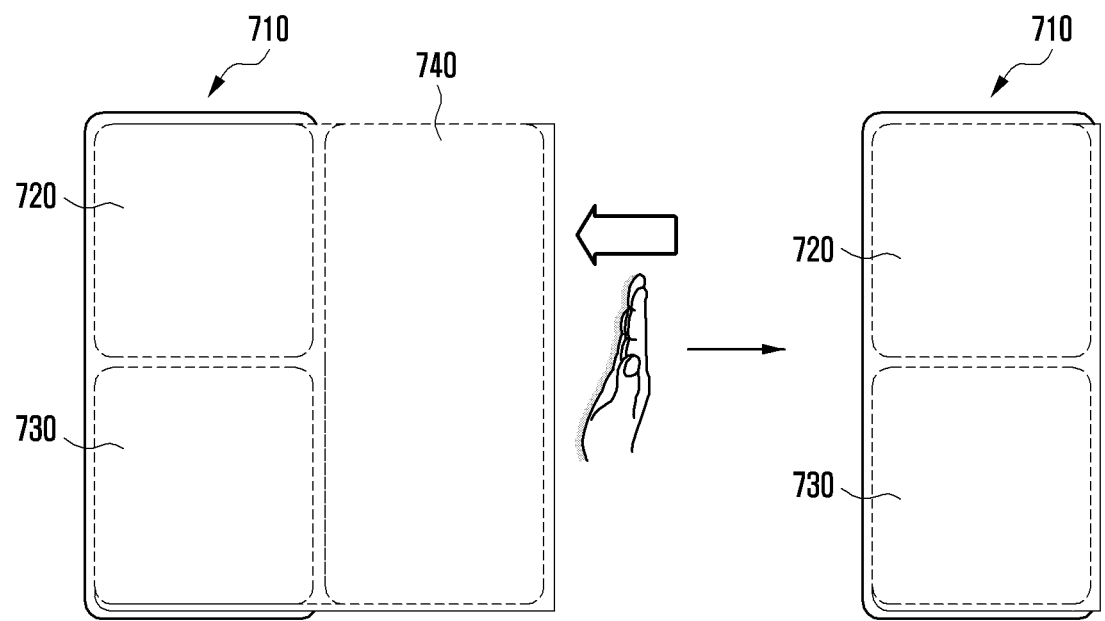
FIGS. 7A and 7B illustrate an example of reducing a display region of a display in an electronic device according to various embodiments of the disclosure.

FIG. 7A illustrates an example of reducing a display region of a display in an electronic device according to an embodiment of the disclosure.

Figure 7B:
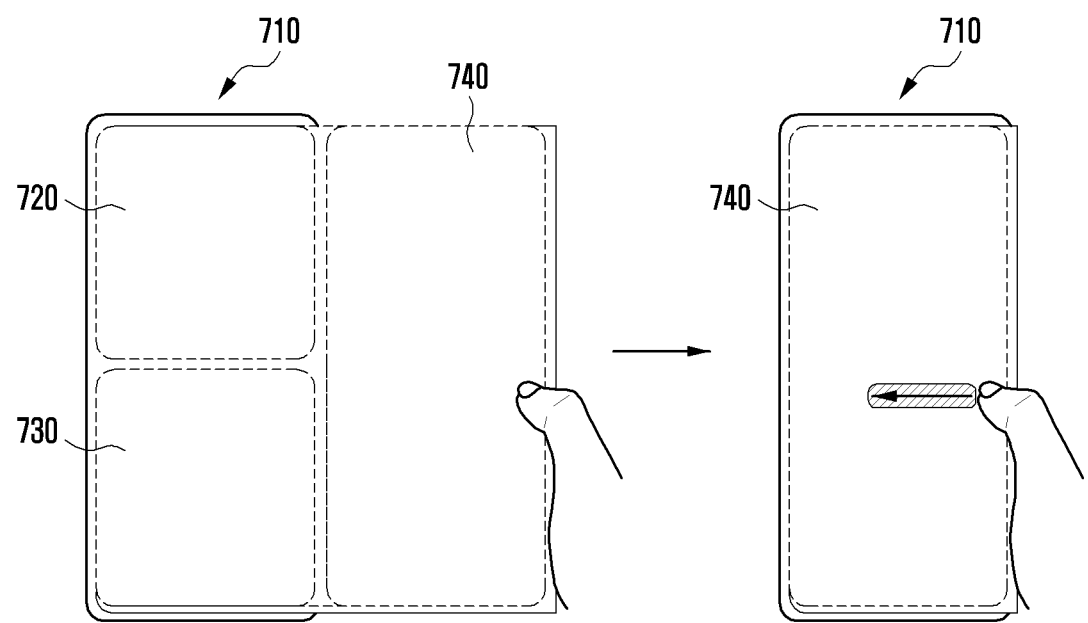

FIG. 7B illustrates an example of reducing the display region of a display in an electronic device according to an embodiment of the disclosure.

According to various embodiments, in an electronic device 710 (e.g., the electronic device 210 in FIG. 2A), the display region of a display may be extended, and the extended display region of the display may be reduced again. Referring to FIGS. 7A and 7B, a first window 720, a second window 730, and a third window 740 may be displayed in the extended display region of the display of the electronic device 710. For example, a user may extend the display region of the display by touching a boundary region between the first window 720 and the second window 730 in the electronic device 710 in which the first window 720 and the second window 730 are displayed. When the display region of the display is extended by touching the boundary region between the first window 720 and the second window 730, the third window 740 may be displayed in the extended display region of the display.

According to various embodiments, the user may reduce the display region of the display of the electronic device 710 without touching the display. For example, as illustrated in FIG. 7A, the user may reduce the display region of the display by pressing the side surface of the electronic device 710. When an input related to the reduction of the display region of the display is received without any user input, the electronic device 710 may return to a pre-extension state. That is, the electronic device 710 may display the first window 720 and the second window 730 in the reduced display region of the display.

According to various embodiments, the user may select one window, which is desired to be displayed in the display region of the display, in order to reduce the display region of the display. For example, the user may select the third window 740, and, as illustrated in FIG. 7B, may touch the third window 740 and input a gesture related to reduction of the display region of the display. In this case, only the third window 740 may be displayed in the reduced display region of the display of the electronic device 710. The gesture related to reduction of the display region of the display may be an operation of swiping on the display or pressing a specific button (e.g., a soft key or a hardware key).

According to various embodiments, the third window 740 may be displayed again when the display region of the display is extended. Alternatively, the third window 740 may be closed when the display region of the display is reduced.

According to various embodiments, the user may intuitionally and easily display a desired window in the display region of the display when reducing the display region of the display.

Figure 8A:
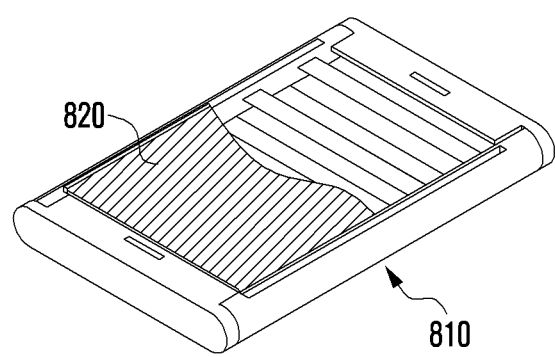
FIGS. 8A, 8B and 8C illustrate an electronic device having a housing, both sides of which are capable of being reduced or extended, according to various embodiments of the disclosure.

FIG. 8A illustrates an electronic device having a housing, both sides of which are capable of being reduced or extended, according to an embodiment of the disclosure.

Figure 8B:
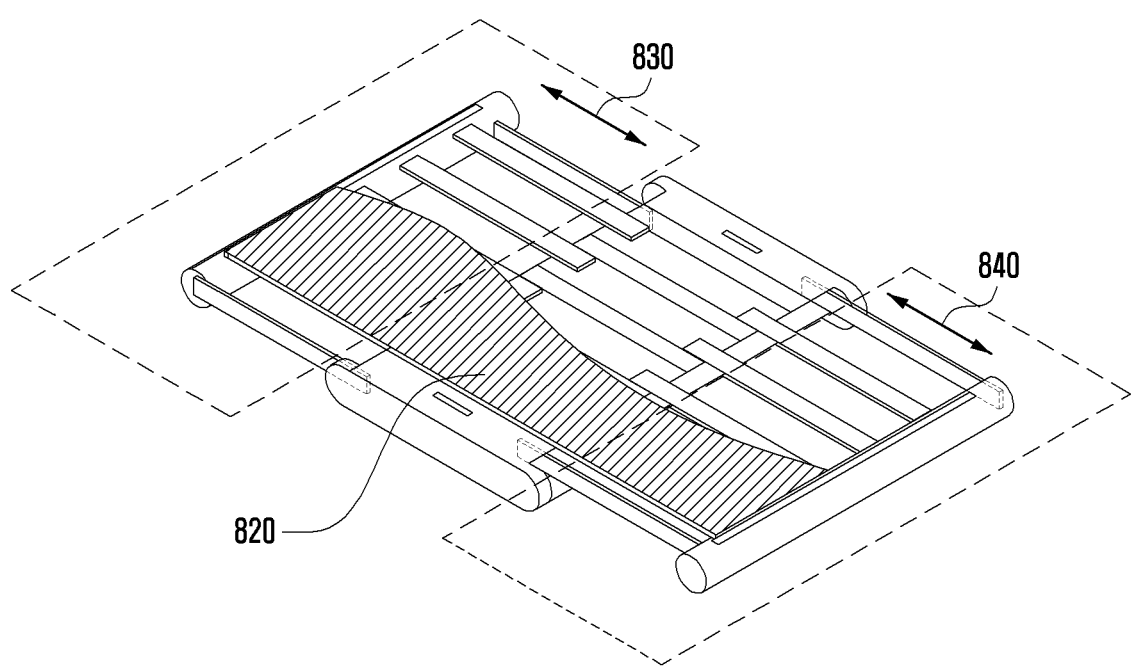

FIG. 8B illustrates an electronic device having a housing, both sides of which are capable of being reduced or extended, according to an embodiment of the disclosure.

Figure 8C:
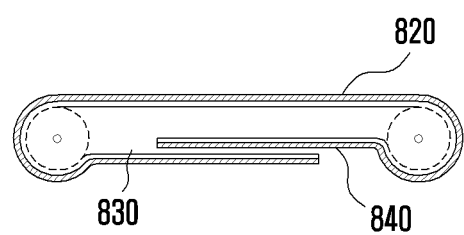

FIG. 8C illustrates an electronic device having a housing, both sides of which are capable of being reduced or extended, according to an embodiment of the disclosure.

According to various embodiments, in the electronic device 210 illustrated in FIG. 2A, one side of a housing may be extended or reduced, and, in an electronic device 810 (e.g., the electronic device 101 in FIG. 1) illustrated in FIGS. 8A to 8C, both sides of a housing may be extended or reduced, and thus the display region of a display 820 may be extended or reduced. The display 820 may be a flexible display.

Referring to FIG. 8A, FIG. 8A is a perspective view of the electronic device 810 and illustrates only a portion of the display region of the display, which is not extended. Referring to FIG. 8B, it is a perspective of the electronic device 810 and illustrates only a portion of the extended display region of the display. In the electronic device 810, the state in which the housing is not extended for ease of portability as illustrated FIG. 8A may be a default state. If necessary, the user may extend only of one side of the housing of the electronic device 810, and furthermore, may also extend the housing at both sides thereof. According to various embodiments, the order of extending or reducing the housing of the electronic device 810 is not limited. When the housing of the electronic device 810 is extended or reduced, the display region of the display may also be extended or reduced.

According to various embodiments, as illustrated in FIG. 8A, a window may be displayed in a first region 830 by extension of one side of the display region of the display of the electronic device 810, and a window may also be displayed in a second region 840 by extension of another side of the display region of the display. Like the electronic device 210 in FIG. 2A, the electronic device 810 in FIG. 8A may include at least one of a multi-bar hinge (e.g., the multi-bar hinge 240 in FIG. 2C), a rolling bar (e.g., the rolling bar 250 in FIG. 2C), and a motor (e.g., the motor 260 in FIG. 2C).

Referring to FIG. 8C, FIG. 8C illustrates one side surface of the electronic device 810 according to various embodiments. The display of the electronic device 810 may include: a region (e.g., display 820) shown in a default state, a first region 830 shown by extension one side of the display region of the display; and a second region 840 shown by extension of another side of the display region of the display. As described with reference to FIG. 2, the first region 830 and the second region 840 of the display region of the display may be shown or hidden by the user's force or operation of the motor.

Figure 9A:
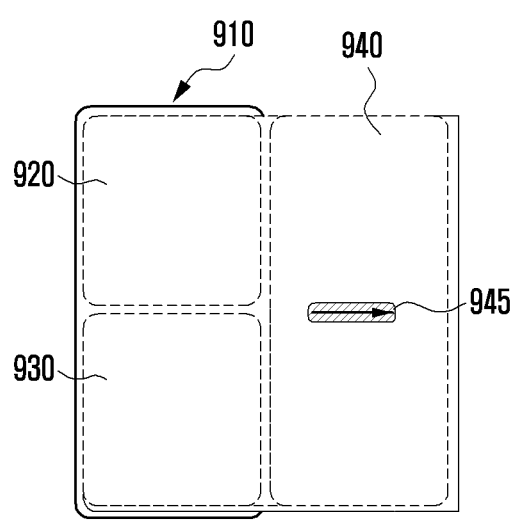
FIGS. 9A, 9B and 9C illustrate an example of manipulating a multi-window by extending a display region of a display in an electronic device, a housing of which can be extended and reduced at both sides thereof, according to various embodiments of the disclosure.
Figure 9B:
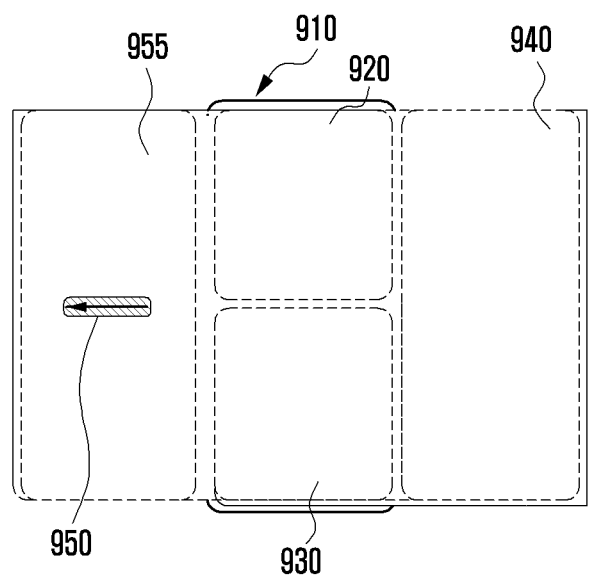
Figure 9C:
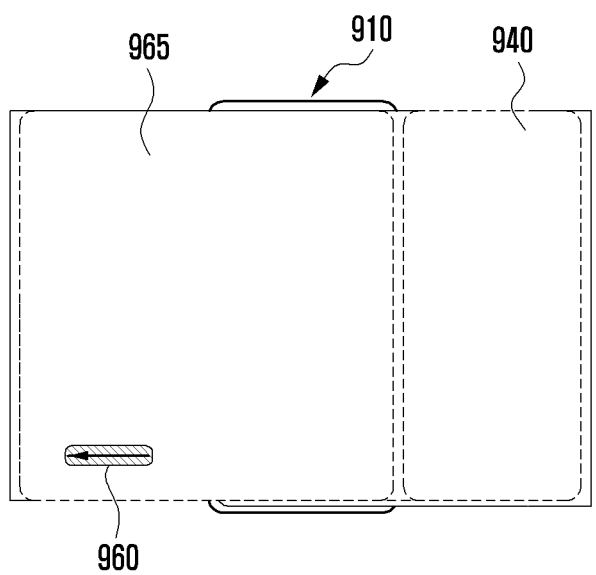

FIGS. 9A to 9C illustrate an example of manipulating a multi-window by extending a display region of a display in an electronic device, a housing of which can be extended and reduced at both sides thereof, according to various embodiments of the disclosure.

Referring to FIG. 9A, FIG. 9A shows the state in which one side of the display region of a display of an electronic device 910 (e.g., the electronic device 310 in FIG. 3A) is extended. A first window 920 and a second window 930 before being extended may be displayed in the display region of the display of the electronic device 910. When a user inputs a gesture 945 for extending the display region of the display by touching a boundary region between the first window 920 and the second window 930, a third window 940 may be further displayed in the extended display region of the display.

According to various embodiments, each of FIGS. 9B and 9C show an example in which another side of the display region of the display of the electronic device 910 is extended. For example, referring to FIG. 9B, the user may touch a boundary region between the first window 920 and the second window 930 to input a gesture 950 for extending the display region of the display. When the user inputs the gesture 950 for extending the display region of the display by touching a boundary region between the first window 920 and the second window 930, a fourth window 955 may be displayed in the extended display region of the display. The first to fourth windows 920, 930, 940, and 955 may be displayed together in the display region of the display of the electronic device 910.

According to various embodiments, referring to FIG. 9C, the user may touch the second window 930 to input a gesture 960 for extending the display region of the display. When the user inputs the gesture 960 for extending the display region of the display by touching the second window 930, a second window 965 may be displayed in the extended display region of the display. The third window 940, in addition to the second window 965, may be displayed together in the display region of the display of the electronic device 910. Referring to FIG. 9C, the second window 965 is displayed in a larger size than the third window 940, but this may be changed by the configuration. For example, when the user configures windows to be displayed in the same size, the second window 965 and the third window 940 may be displayed in the same size.

According to various embodiments, the user's gesture of extending one side of the display region of the display may be the same as the user's gesture of extending another side of the display region of the display, differing only in the direction. Alternatively, completely different gestures may be used. The user's gesture may be, for example, the user's touch input using a hand or a tool (e.g., a pen) or an input using a hand holding the electronic device 910, but is not limited thereto.

Figure 10A:
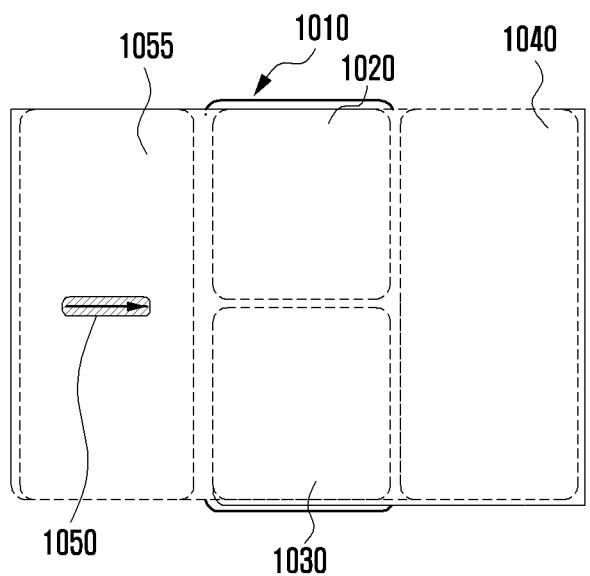
FIGS. 10A, 10B and 10C illustrate an example of manipulating a multi-window by reducing both extended sides of a display region of a display of an electronic device according to various embodiments of the disclosure.
Figure 10B:
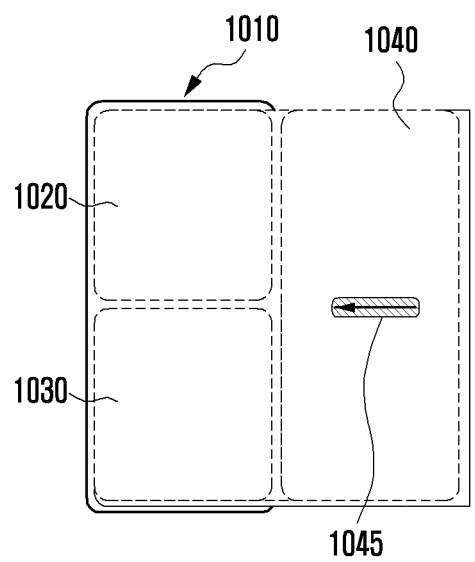
Figure 10C:
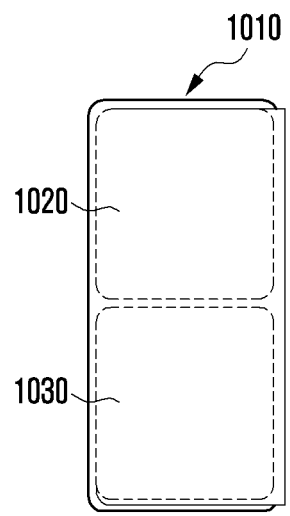

FIGS. 10A to 10C illustrate an example of manipulating a multi-window by reducing both extended sides of a display region of a display of an electronic device according to various embodiments of the disclosure.

Referring to FIG. 10A, FIG. 10A shows an example of reducing both sides of a display of an electronic device 1010 in the state in which the display region of the display is extended at both sides thereof as shown in FIG. 9C. A first window 1020, a second window 1030, a third window 1055, and a fourth window 1040 may be displayed in the display region of the display, which is extended at both sides thereof. When a user inputs a gesture 1050 in a region corresponding to a boundary region between the first window 1020 and the second window 1030 in the third window 1055 in order to reduce one side of the display region of the display, the third window 1055 may not be displayed or may be closed, referring to FIG. 10B. Subsequently, when the user inputs a gesture 1045 in a region corresponding to a boundary region between the first window 1020 and the second window 1030 in the fourth window 1040, the fourth window 1040 may not be displayed or may be closed, referring to FIG. 10C.

According to various embodiments, the user may reduce both sides of the display region of the display at once. For example, the user may push both sides of a housing of the electronic device 1010 to reduce both sides of the display region of the display at once. When both sides of the display region of the display are reduced at once, only the first window 1020 and the second window 1030 may be displayed in the display region of the display.

Figure 11A:
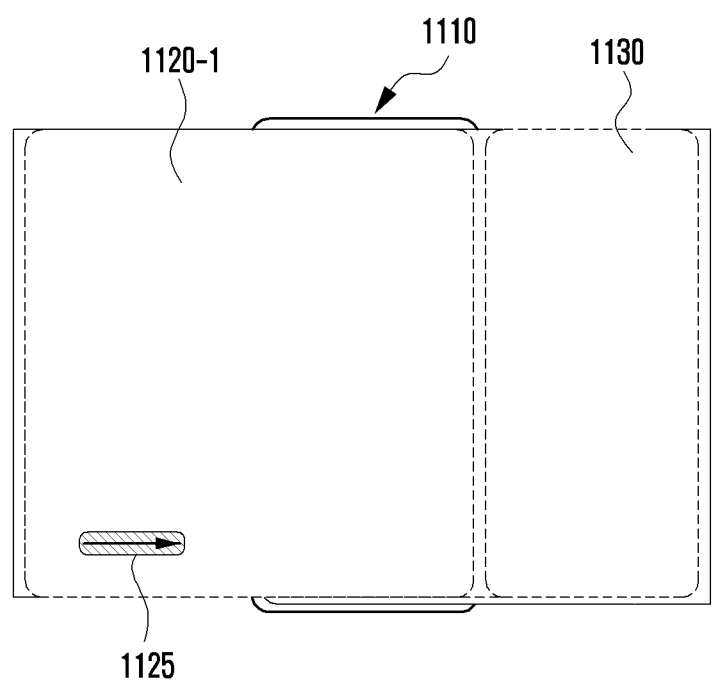
FIGS. 11A and 11B illustrate an example of manipulating a multi-window by reducing one of both extended sides of a display region of a display of an electronic device according to various embodiments of the disclosure.
Figure 11B:
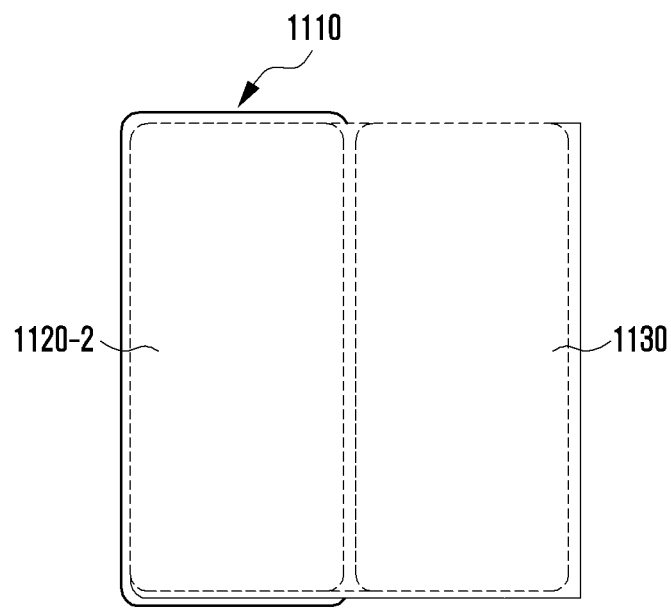

FIGS. 11A and 11B illustrate an example of manipulating a multi-window by reducing one of both extended sides of a display region of a display of an electronic device according to various embodiments of the disclosure.

Referring to FIG. 11A, FIG. 11A shows an example of reducing one side of the display region of a display of an electronic device 1110 in the state in which the display region of the display is extended at both sides thereof as shown in FIG. 9C. A second window 1120-1 and a third window 1130 may be displayed in the display region of the display, which is extended at both sides thereof. When a user inputs a gesture 1125 in order to reduce one side of the display region of the display, a window in which the user's gesture 1125 is input may be reduced and displayed at one side of the display region of the display, referring to FIG. 11B. A second window 1120-2 and the third window 1130 may be displayed in the display region of the display, which is reduced at one side thereof.

Figure 12:
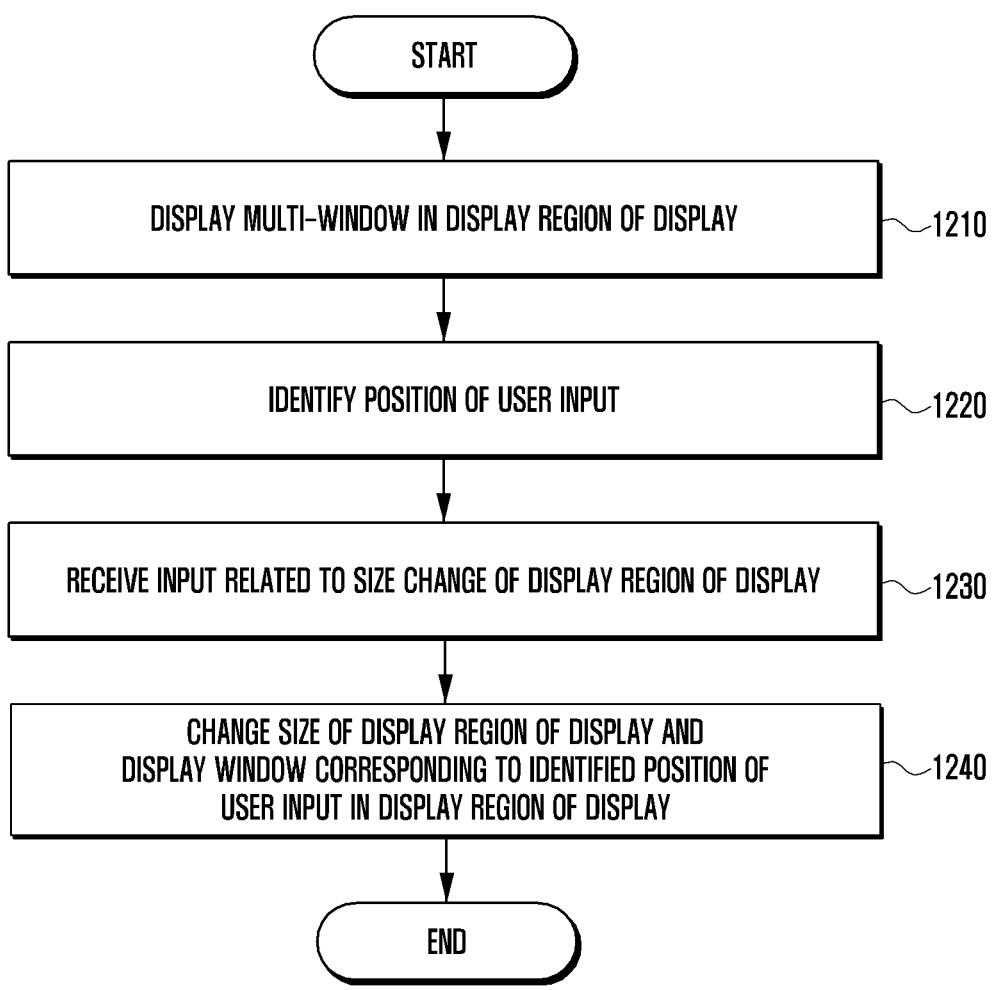
FIG. 12 is a flowchart of manipulation of a multi-window in an electronic device according to an embodiment of the disclosure.

FIG. 12 is a flowchart of manipulation of a multi-window in an electronic device according to an embodiment of the disclosure.

Referring to FIG. 12, in operation 1210, an electronic device (e.g., the electronic device 310 in FIG. 3A) may display a multi-window in the display region of a display. The number of multi-windows is not limited. Multi-windows may be displayed in the same size or in different sizes. In a multi-window, different applications may be executed and the execution screens of the applications may be displayed, and different execution screens of the same application may be displayed.

In operation 1220, according to various embodiments, the electronic device 310 may identify the position of a user input. For example, the position of the user input may be the position of a hand (e.g., a finger) holding the electronic device 310. In another example, the position of the user input may be the input position of a user's finger or tool (e.g., a stylus pen) touching the display of the electronic device 310.

In operation 1230, according to various embodiments, the electronic device 310 may receive an input related to the size change of the display region of the display. The input related to the size change of the display region of the display may be an input related to extension or reduction of a housing. The input related to the size change of the display region of the display may be an input for moving at least a portion of a housing of an electronic device to extend or reduce the housing.

According to various embodiments, the input related to the size change of the display region of the display may be an input through a user's gesture. For example, the electronic device 310 may recognize the user's gesture of swiping toward one side of the housing as an input related to the size change of the display region of the display.

Alternatively, when the user presses a hardware key (e.g., a side key) or a soft key, the electronic device 310 may recognize the pressing as an input related to the size change of the display region of the display. According to various embodiments, the user may preset a particular gesture (e.g., an operation of extending or reducing using multiple fingers) as an input related to the size change of the display region of the display.

In operation 1240, the electronic device 310 may change the size of the display region of the display, and may display a window corresponding to the identified position of a user input in the display region of the display. According to various embodiments, the electronic device 310 may extend or reduce the display region of the display on the basis of the input related to the size change of the display region of the display. Further, the electronic device 310 may display the window corresponding to the identified position of a user input in the extended or reduced display region of the display. For example, when the identified user input is positioned in a predetermined window among multi-windows, the window in which the user input is positioned may be extended or reduced. The extended or reduced window may be displayed in all or a portion of the extended or reduced display region of the display. In another example, when the identified user input is positioned in a multi-window boundary region, a new window may be displayed in the extended display region of the display.

According to various embodiments, the size of the display region of the display may be changed in an automatic, semiautomatic, or manual manner For example, the display region of the display of the electronic device 310 may be manually extended or reduced by the user's force. The display region of the display may be extended or reduced by the housing of the electronic device 310. The electronic device 310 may detect the strength of the user's force, and may manually extend or reduce the display region of the display when the detected strength of the user's force is equal to or smaller than a predetermined strength, and may automatically extend or reduce the display region of the display by using a motor when the detected strength of the user's force is equal to or larger than the predetermined strength. Alternatively, the display region of the display of the electronic device 310 may be automatically extended or reduced by a particular key (e.g., a hard key or a software key).

According to various embodiments, the display region of the display may be updated after the display is completely extended or reduced. The display region of the display may be updated in real time/at regular time intervals while the display is extended or reduced. The display region of the display may be updated in units of a certain size of a region extended or reduced while the display is extended or reduced.

Referring to FIG. 12, an example in which one side of the display region of the display of the electronic device 310 is extended or reduced has been described. However, as illustrated in FIG. 9A to FIG. 9C, another side of the display region of the display of the electronic device 310 may also be extended or reduced.

An electronic device according to various embodiments may include a display and a processor, wherein the processor is configured to: display a multi-window in a display region of the display; identify a position of a user input; receive an input related to a size change of the display region of the display; and change a size of the display region of the display and display a window corresponding to the identified position of the user input in the display region of the display.

In the electronic device according to various embodiments, the input related to the size change of the display region of the display may be an input for increasing the size of the display region of the display.

The processor of the electronic device according to various embodiments may identify a window corresponding to the position of the user input in the multi-window.

The processor of the electronic device according to various embodiments may display the identified window in an extended display region of the display.

In the electronic device according to various embodiments, in the window displayed in the extended display region of the display, a pre-extension window may be extended and displayed, or a hidden region of the pre-extension window may be further displayed.

The processor of the electronic device according to various embodiments may determine that the position of the user input is a boundary of the multi-window.

The processor of the electronic device according to various embodiments may display a predetermined window in the display region of the display.

In the electronic device according to various embodiments, the predetermined window may be a window in which one of a home screen and a screen having a particular application executed thereon is displayed.

In the electronic device according to various embodiments, the input related to the size change of the display region of the display may be an input for reducing the size of the display region of the display.

The processor of the electronic device according to various embodiments may identify a window corresponding to the position of the user input in the multi-window.

The processor of the electronic device according to various embodiments may display the identified window in a reduced display region of the display.

The processor of the electronic device according to various embodiments may determine that the user input is positioned outside the display region of the display.

The processor of the electronic device according to various embodiments may display, in the reduced display region of the display, a multi-window displayed in a pre-extension display region of the display.

An operation method of an electronic device according to various embodiments may include: identifying a position of a user input; receiving an input related to a size change of a display region of a display; and changing a size of the display region of the display and displaying a window corresponding to the identified position of the user input in the display region of the display.

In the operation method of the electronic device according to various embodiments, the input related to the size change of the display region of the display may be an input for increasing a size of the display region of the display.

In the operation method of the electronic device according to various embodiments, the identifying of the position of the user input may be identifying a window corresponding to the position of the user input in the multi-window.

In the operation method of the electronic device according to various embodiments, the displaying of the window corresponding to the identified position of the user input in the display region of the display may be displaying the identified window in an extended display region of the display.

In the operation method of the electronic device according to various embodiments, the displaying of the identified window in the extended display region of the display may be extending and displaying a pre-extension window in the extended display region of the display or further displaying a hidden region of the pre-extension window in the extended display region of the display.

In the operation method of the electronic device according to various embodiments, the identifying of the position of the user input may be identifying that the position of the user input is a boundary of the multi-window.

In the operation method of the electronic device according to various embodiments, the displaying of the window corresponding to the identified position of the user input in the display region of the display may be displaying a predetermined window in the display region of the display.

In the operation method of the electronic device according to various embodiments, the receiving of the input related to the size change of the display region of the display comprises swiping on a user interface graphic element displayed in the window.

In the operation method of the electronic device according to various embodiments, increasing the size of the display region of the display comprises extending one of a second housing or a slideable plate to support the increased size of the display region of the display.

In the operation method of the electronic device according to various embodiments, extending one of a second housing or a slideable plate is performed by at least one of manual operation by a user and automatic operation by an internal driving mechanism.

Various other embodiments are possible.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a motor;
a housing configured to be extended or reduced by the motor;
a flexible display configured to change a size of a display region according to extension of the housing or reduction of the housing; and a processor,
wherein the processor is configured to:
- display a multi-window in the display region,
- receive a notification in the display region,
- receive a user input for extending the display region at a position at which the notification is displayed,
- in response to receiving the user input and based on a position of the user input,
- extend the display region according to a movement of the housing, and
- execute an application related to the notification to be displayed in the extended display region of the display.

2. The electronic device of claim 1, wherein the processor is further configured to extend the display region according to an extension of the housing.

3. The electronic device of claim 2, wherein the processor is further configured to display the executed application in a window in the extended display region of the display.

4. The electronic device of claim 3, wherein, in the window displayed in the extended display region, a pre-extension window is extended and displayed or a hidden region of the pre-extension window is further displayed.

5. The electronic device of claim 2, wherein the processor is further configured to determine that the position of the user input is a boundary of the multi-window.

6. The electronic device of claim 5, wherein the processor is further configured to display a predetermined window in the display region.

7. The electronic device of claim 6, wherein the predetermined window comprises a window in which one of a home screen or a screen having a particular application executed thereon is displayed.

8. The electronic device of claim 1, wherein the processor is further configured to reduce the display region according to the reduction of housing.

9. The electronic device of claim 8, wherein the processor is further configured to identify a window corresponding to a position of an other user input in the multi-window.

10. The electronic device of claim 9, wherein the processor is further configured to display the identified window in a reduced display region.

11. The electronic device of claim 8, wherein the processor is further configured to determine that the other user input is positioned outside the display region.

12. The electronic device of claim 11, wherein the processor is further configured to display, in the reduced display region, a multi-window displayed in a pre-extension display region of the display.

13. An operation method of an electronic device, the method comprising:
- displaying a multi-window in a display region of a display the display being a flexible display configured to change a size of the display region according to extension of a housing or reduction of the housing, wherein the housing is configured to be extended or reduced by a motor;
- displaying a notification in the display region;
- receiving a user input for extending the display region at a position at which the notification is displayed;
- in response to receiving the user input and based on a position of the user input,
- extending the display region according to a movement of the housing; and
- executing an application related to the notification to be displayed in the extended display region of the display.

14. The operation method of claim 13, wherein the extending the display region comprises extending the display region according to an extension of the housing.

15. The operation method of claim 14, further comprising:
displaying the executed application in a window in the extended display region of the display.

16. The operation method of claim 15, further comprising:
displaying a pre-extension window in the extended display region of the display or further displaying a hidden region of the pre-extension window in the extended display region of the display.

17. The operation method of claim 14, further comprising:
selecting a window based on a position of a user input being a boundary of the multi-window.

18. The operation method of claim 17, further comprising:
displaying a predetermined window in the display region based on the position of the user input being a boundary of the multi-window.

* * * * *